June 27, 1961     D. H. RINDY     2,990,467
METHOD OF FABRICATING ELECTRICAL UNITS
Filed May 6, 1958
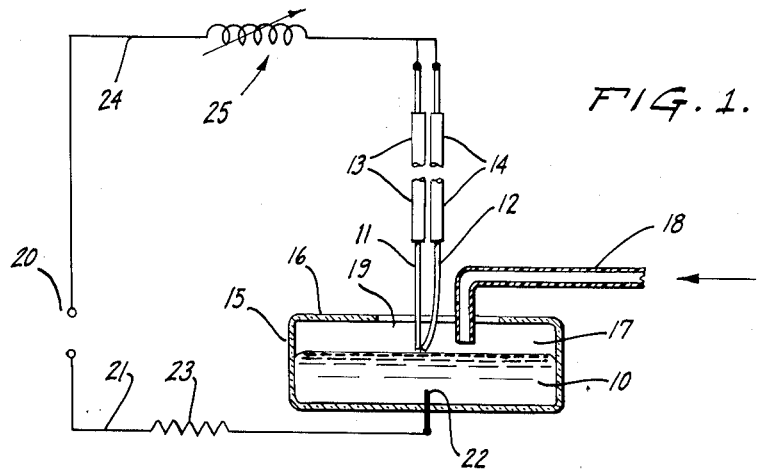
FIG. 1.
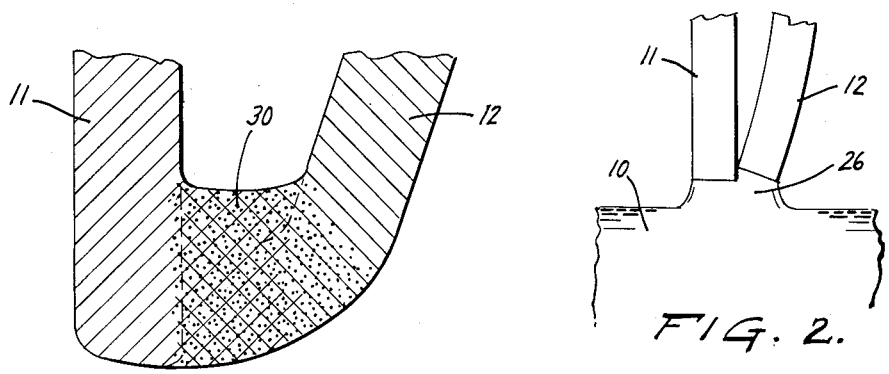
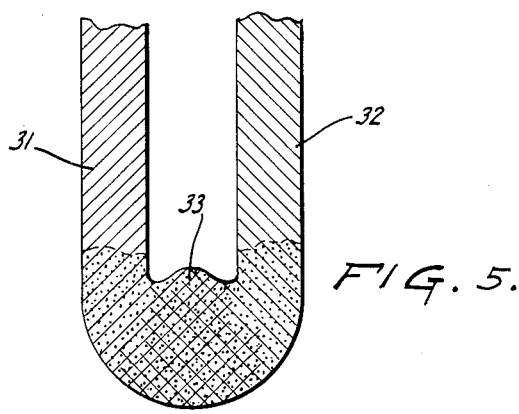
FIG. 4.
FIG. 5.
FIG. 2.
FIG. 3.
INVENTOR.
DARYL H. RINDY
BY F.D. Pryor
ATTORNEY

United States Patent Office 2,990,467
Patented June 27, 1961

2,990,467
METHOD OF FABRICATING ELECTRICAL UNITS
Daryl H. Rindy, Johnsville, Pa., assignor to Philco Corporation, Philadelphia, Pa., a corporation of Pennsylvania
Filed May 6, 1958, Ser. No. 733,382
3 Claims. (Cl. 219—117)

This invention relates to the fabrication of thermocouples and particularly to that of measuring thermocouples.

Although thermocouples have been made for many years and by a variety of welding, soldering and other methods, it was hitherto impossible, so far as I know, to predict the exact thermoelectric characteristics of a newly fabricated element of this type. This was so even when carefully selected metals were used and when welding or soldering conditions were maintained in what appeared as adequate and uniform ways. As a result, expensive operations, including calibration of the thermocouples, were required wherever exact characteristics of the thermocouples were important. The present invention, by contrast, provides a simple way or method of fabricating thermocouples which method requires no subsequent calibration of the product and yet produces thermocouples of quantitatively uniform and/or exactly predictable characteristics.

For this purpose the dissimilar metals of the thermocouple are joined, according to the invention, by an arc welding procedure not thus far employed in this field, this procedure being characterized by the use of a pool of liquid metal, and particularly mercury, as a welding electrode. The surface of this electrode is advantageously disposed in a neutral gas atmosphere which also surrounds the dissimilar metallic members to be joined by the welding arc. These and other characteristics of the invention, and their beneficial results, will be understood most readily from the following detailed disclosure.

In the drawing,

FIGURE 1 is a schematic diagram of apparatus used in carrying out the new method.

FIGURE 2 is an enlarged detail from FIGURE 1 showing a condition which exists under one particular set of circumstances.

FIGURE 3 is a similar detail showing a condition subsequently created.

FIGURE 4 is a more enlarged detail corresponding to a portion of FIGURE 3 and showing a thermocouple joint produced by the new method; and FIGURE 5 is a detail similar to FIGURE 4, showing a different thermocouple joint produced by the new method.

Referring first to FIGURE 1, a mercury pool 10 is provided below a pair of dissimilar metallic elements 11, 12, for instance of antimony and cadmium, or of zinc and bismuth, or nickel and platinum, etc. These elements are shown as wires generally covered by insulation 13, 14 but having such insulation stripped from the ends to be joined. The mercury is kept in a glass vessel 15; and an inwardly extending lip 16 on the upper edge of the glass vessel forms a chamber 17 in said vessel, above the mercury. This chamber is substantially filled with a neutral or inert gas, such as argon, which may be introduced through a tube 18; and a continuous flow of the gas is desirably maintained during the performance of the new method, from the discharge end of tube 18 through chamber 17 and out through opening 19, defined by flange 16. This opening also serves to introduce the wires 11 and 12 into the vessel.

An electrical potential is maintained between mercury 10 and dissimilar wires 11 and 12, by a power source 20 which has one terminal connected with the mercury through conductor 21 and electrode 22, with resistor 23 interposed therebetween; the other terminal of the power source being connected with one end of each wire 11, 12 by a conductor 24. A variable inductor, resistor, transformer or the like, such as a variac 25, is interposed in conductor 24 between source 20 and thermocouple wires 11, 12.

FIGURE 1 shows the wires 11, 12 inserted into vessel 15 and just about to contact mercury pool 10. In some cases an arc is established at this moment; in other instances it is necessary first to contact the mercury with the wires, thereby forming a meniscus 26 of mercury, FIGURE 2, between the pool and one or both of members 11, 12 and then to break the meniscus for the purpose of striking the arc. In either case an arc 27 is established between the pool and the ends of wires disposed above and adjacent the pool, in the inert gas atmosphere, as schematically shown in FIGURE 3. It is also necessary, of course, to provide and/or maintain a suitable electrical potential between the pool and the wires, by proper adjustment of variac 25; for instance in many cases it has been found proper to maintain an A.C. potential of five volts between the pool and a set of constantan-iron wires of three mil thickness.

The wire ends are desirably held adjacent to or in contact with one another, in an area 29, which area may in many cases comprise, essentially, a point, or be very limited in extent. At any rate the ends of the dissimilar wires to be joined are kept in such relation to one another that fusion may readily occur therebetween, when and as the wire ends are liquefied and partly vaporized by the heat of arc 27. As mercury vapor is generated in this process it is preferred to protect the operator's health from toxic influences of such vapor, for instance by well-known hood and exhaust means, not shown.

The arc can and should be extinguished promptly after the striking thereof, and as soon as metal of the wires has been liquefied and fused. Wires 11, 12 can be raised for this purpose; however, advantageously the arc is extinguished as a result of conditions including effects of the welding process itself. This process tends to form a slight depression 28 in the surface of the mercury pool directly below the wire ends being joined by the blast of the arc, while also tending to cause the liquefied metal to form a drop or ball, so that such metal contracts into a small space and withdraws a small distance upwardly while the surface of the mercury pool withdraws a small distance downwardly. When the arc has thus been extinguished the fused metal congeals readily, thereby forming the thermocouple.

One typical product of the fusion of dissimilar metals, obtained in this process, is illustrated in FIGURE 4, wherein a weld bead 30 has been formed between wires 11, 12 of iron and constantan, the various re-crystallized and heat affected zones, etc. being schematically indicated by the cross-hatched and stippled portions of the diagram. Some of the upwardly withdrawn metal may be noted in the upper part of bead 30. A somewhat different condition is shown in FIGURE 5 wherein wires 31, 32 of Chromel and Alumel have been joined by an approximately spherical weld bead 33.

In each of these examples, and in various further modifications of the invention which will be obvious to persons skilled in the art, the weld bead or thermocouple joint, produced by the present method, is found to be singularly homogeneous and reliable. The thermocouple surfaces so produced are substantially free from surface pitting, encountered in other methods; their microstructures, as revealed by properly taken micrographs, are very uniform; and their exact characteristics as to generation of an electromotive force in response to various temperatures, are equally uniform. These latter characteristics are subject to variations of at most a very few percent, and often subject to even smaller tolerances, so long as the selection and arrangement of the wire ends exposed to the welding arc are kept reasonably uniform. The exact and complete reasons of this remarkable uniformity and high quality of the products obtained by the new method are presently unknown, but so much has been determined that the process conditions described and emphasized herein are required for this purpose.

Heretofore, variations of thermocouple characteristics were much greater, often several orders of magnitude greater, under otherwise similar conditions; this applied for instance when the dissimilar wires were arc-welded with the aid of a carbon electrode. As a result it was thus far necessary to expend much time, effort and money in calibrating the thermocouples produced, in order to allow their successful use for measuring purposes and the like. This necessity is drastically reduced or even eliminated by the new method.

While the new method has been illustrated by way of a single example, it should be understood that the details thereof are not to be construed as limitative of the invention, except insofar as is consistent with the scope of the following claims.

I claim:

1. In a method of fabricating thermocouples, wherein end portions of wires consisting of dissimilar metals are joined by an electrical arc established between such end portions and a pool of mercury, so as to liquefy said end portions while an atmosphere of inert gas contacts the exposed surface of the pool and surrounds the end portions, the improvement which comprises: extinguishing the arc, promptly when it has thus been established, with the aid of the blast which the arc itself produces in a portion of said atmosphere, and which downwardly displaces a portion of said exposed surface of the pool adjacent the end portions of the wires.

2. In a method of arc welding thermocouples: maintaining an atmosphere of inert gas overlying and contacting the top surface of a pool of mercury; establishing a meniscus of mercury between said surface and juxtaposed end portions of solid members of dissimilar metals; striking an electrical arc by steps which include breaking said meniscus; liquefying said end portions by said arc; and thereupon promptly extinguishing the arc, with the aid of the blast of said arc itself which downwardly displaces mercury of the broken meniscus into the surface portion of the pool.

3. A method of arc welding thermocouples for measuring purposes, comprising the steps of: maintaining a pool of mercury and, in directly overlying relation to the top surface thereof, an atmosphere of inert gas; juxtaposing end portions of two wires of dissimilar metals, one with the other and both with said pool, in said atmosphere; establishing an electrical arc between the so juxtaposed end portions and said pool so as to liquefy and fuse metal of said end portions; and then promptly extinguishing the arc, with the air of downward displacement of mercury by the blast of the arc and with the further aid of said fusing of the liquefied metal.

References Cited in the file of this patent
UNITED STATES PATENTS

| | | |
|---|---|---|
| Re. 16,087 | Phelan | May 16, 1925 |
| 2,843,726 | Kierman | July 15, 1958 |